United States Patent [19]
Sprague

[11] Patent Number: 6,160,606
[45] Date of Patent: Dec. 12, 2000

[54] OPTICAL EQUIVALENTS OF FIBER OPTIC FACE PLATES USING IRRADIATION SENSITIVE GLASS

[75] Inventor: Robert A. Sprague, Saratoga, Calif.

[73] Assignee: Xerox Corporation, Stamford, Conn.

[21] Appl. No.: 08/906,222

[22] Filed: Aug. 5, 1997

[51] Int. Cl.[7] .............................. G02F 1/1333; G03F 7/00
[52] U.S. Cl. ........................... 349/159; 385/115; 65/425; 430/321; 430/290
[58] Field of Search .............................. 349/159; 385/123, 385/142, 115, 116, 120; 65/385, 425, 429, 33.2, 442, 389; 430/290, 321

[56] References Cited

U.S. PATENT DOCUMENTS

| | | | |
|---|---|---|---|
| 3,742,731 | 7/1973 | Phillips et al. | 63/32 |
| 4,721,352 | 1/1988 | Sorin et al. | 350/96.15 |
| 4,893,907 | 1/1990 | Mallinson | 350/350 S |
| 5,136,677 | 8/1992 | Drexhage et al. | 385/123 |
| 5,170,455 | 12/1992 | Goossen et al. | 385/89 |
| 5,317,429 | 5/1994 | Mochizuki et al. | 359/42 |
| 5,361,320 | 11/1994 | Liu et al. | 385/143 |
| 5,442,467 | 8/1995 | Silverstein et al. | 359/42 |
| 5,445,921 | 8/1995 | Palmer | 430/311 |
| 5,462,700 | 10/1995 | Beeson et al. | 264/1.27 |
| 5,589,101 | 12/1996 | Khoo | 252/299.01 |
| 5,928,819 | 7/1999 | Crawford et al. | 430/20 |
| 5,959,711 | 10/1999 | Silverstein et al. | |

Primary Examiner—Kenneth Parker
Attorney, Agent, or Firm—Nola Mae McBain

[57] ABSTRACT

Optical plates which have columnar features approximately in the direction of light propagation which are capable of total internal reflection, a controllable numeric aperture (NA) at input and output surfaces, rotational azimuthal averaging and translation of the object plane from a back surface of the plate to a front surface of the plate and are optical equivalent of a FOFP. These plates are made from a composition of irradiation sensitive glass which has been etched in either the columnar features or the surrounding features. If the surrounding features have been etched, the etched areas are filled with either a low melt glass or plastic or a light blocking material such as a black composition material. If the columnar features have been etched the etched areas are filled with a low melt glass or plastic. The resultant plates contain adjacent areas with differing refractive indices which result in a substrate containing a plurality of cylindrical features whose boundaries are defined by a discontinuity of refractive indices wherein the index of refraction within the cylindrical features is greater than the index of refraction at the boundaries and external to the cylindrical features.

34 Claims, 16 Drawing Sheets

OPTICAL EQUIVALENTS OF FIBER OPTIC FACE PLATES USING IRRADIATION SENSITIVE GLASS

CROSS REFERENCE TO RELATED APPLICATIONS

This application is related to my application Ser. No. 08/906,866, filed concurrently and titled "Methods to Fabricate Optical Equivalents of Fiber Optic Face Plates Using Irradiation Sensitive Glass".

BACKGROUND

This invention relates generally to fiber optic face plates and more particularly concerns methods in which a photoform glass can be etched and then the etched portions filled with either a melted low index glass, plastic, or a dark matrix material for fabrication of fiber optic faceplate equivalents.

Fiber optic faceplates (FOFPs) are useful in the construction of liquid crystal displays as disclosed in U.S. Pat. No. 5,442,467, filed on Mar. 21, 1994, by Silverstein et al., the subject matter of which is incorporated herein by reference. U.S. Pat. No. 5,442,467 discloses a direct-view rear-illuminated LCD device, comprising: a backlight source; a rear diffuser layer; a rear polarizer; a LC cell including a rear glass layer with addressing elements and indium tin oxide (ITO) transparent pixel electrodes, a LC layer having a top and bottom surface, and a front FOFP as a front containing element of the LC cell and being located directly in contact with the top surface of the liquid crystal layer; a mosaic array of color absorption filters either deposited on the front face of the FOFP or located on a separate but adjacent substrate; and a front polarizer or analyzer. Alternatively, the front polarizer or analyzer may be constructed from thin-film materials and located between the top or light exit surface of the LC layer and the bottom or light input surface of the FOFP.

An FOFP comprises an array of individual optical fibers which are fused together with an interstitial cladding material and then cut and polished to a desired thickness to form a plate. The creation of FOFPs with varying optical characteristics is well known in the art. The optical fibers are designed to transmit through total internal reflection light incident at controlled input or acceptance angles while rejecting or absorbing light incident at larger angles. Light entering the fibers at an entrance plane of the FOFP is collected over a wide acceptance angle $\theta_{Max}$IN by use of a high numerical aperture (NA) FOFP and/or coupling to a boundary of low refractive index (e.g., air). Light exiting the optical fibers of an exit plane of the FOFP is made to diverge or exit over a relatively wide angle $\theta_{Max}$OUT also by use of a high NA and/or the ultimate coupling to a low refractive index boundary. FOFPs with low NAs and/or coupling to relatively high refractive index materials (e.g., plastic, polyimide, or optical glass) restrict the light output exit angle, $\theta_{Max}$OUT, of the exit plane of the FOFP and the light input acceptance angle, $\theta_{MAX}$IN, of the entrance plane of the FOFP, respectively.

These relations are illustrated in FIG. 1 for a typical optical fiber 10. Light beam 16 enters the optical fiber 10 within the acceptance cone 20 defined by an angle $\theta_{max}$, which is measured from normal line N, and is totally internally reflected within a core 12 of the optical fiber 10 to propagate down the length of the optical fiber 10, essentially without loss. The normal N is perpendicular to an entrance plane 30 and an exit plane 32 of the optical fiber 10. If the relative index of material surrounding the optical fiber 10 at the entrance plane 30 and exit plane 32 surfaces ($N_o$) is the same, then the light beam 16 will exit the optical fiber 10 at the same angle, in this example $\theta_{max}$, which it entered. Light beam 18, which enters the optical fiber 10 outside of the acceptance cone 20 defined by $\theta_{max}$ is not fully guided through the length of the optical fiber 10 and "leaks" out of the optical fiber 10 into adjacent cladding material 14. Light beam 16 is a guided light beam while light beam 18 is an unguided light beam. An unguided or partially guided light beam may pass through the cladding material 14 and enter other fibers in a fiber-optic bundle or fused faceplate. However, unguided or partially guided light beams typically leak out of these fibers as well and continue to traverse the bundle or faceplate.

FIGS. 2 and 3 show the effects of varying the numerical aperture of the optical fiber 10. FIG. 2 shows the optical fiber 10 having a small numerical aperture and thus a smaller light acceptance cone 20. FIG. 3 shows the optical fiber 10 having a large numerical aperture and thus a larger light acceptance cone 20. Thus, the higher the numerical aperture of the fiber 10, the larger $\theta_{max}$ at the entrance plane 30 and the exit plane 32.

In general, light which enters the optical fiber 10 is rotated about a central axis of the optical fiber 10 as it propagates along the length of the optical fiber 10 as shown in FIG. 4. In this example the central axis of the optical fiber 10 happens to be coincident with the normal N used to measure the angle $\theta_{max}$. Thus, light which enters at a given angle from the normal N to the fiber input surface exits the optical fiber 10 at the same exit angle, but at a rotated azimuthal position. This rotation is dependent on the number of reflections within the optical fiber 10 and also by the internal surfaces of the fibers. Skew rays typically undergo more rotation than meridional rays. For the application of FOFPs to LCDs, most of the illumination entering the fiber will be skew rays.

In FIG. 4, a light ray 24 and a light ray 26 can be seen entering the optical fiber 10 at the entrance plane 30 at an angle $\theta_{max}$ measured with respect to a normal N. Light ray 24 is parallel to light ray 26 and they enter the optical fiber at different points on the entrance plane 30. As each light ray 24, 26 exits at the output plane 32 of the optical fiber 10, it can be seen that each light ray 24, 26 exits at an angle $\theta_{max}$ but having undergone an azimuthal rotation angle $\phi$ around the central axis of the optical fiber 10.

As explained above, in fused fiber optic bundles and faceplates, both guided and unguided rays undergo azimuthal rotation. As shown in FIG. 4, the consequence of this rotation is that the optical fiber 10 averages about the azimuthal position all of the incoming light entering at a given declination angle such that the output consists of a hollow exit cone 22 with a solid angle of twice the entrance angle. In FIG. 4, because both illustrated incoming light rays 24, 26 enter the optical fiber 10 at an angle $\theta_{max}$, the solid angle of the hollow exit cone 22 is $\theta_{max}$. As the light emerging as a hollow exit cone 22 consists of an average about the azimuthal position, the transmitted light intensity is equal at all azimuthal angles. It is this property of azimuthal averaging that enables FOFPs to produce symmetrical viewing characteristics over wide angles when coupled to a LCD with inherent anisotropies in luminance and contrast.

FIG. 5 illustrates an FOFP 28 made of an array of individual optical fibers which are fused together with an interstitial cladding material and then cut and-polished to a desired thickness to form a plate. The core 12 and cladding material 14 can be seen on the surface of the FOFP 28.

Therefore, any plate which has columnar features approximately in the direction of light propagation which are capable of total internal reflection, a controllable numeric aperture (NA) at input and output surfaces, rotational azimuthal averaging and translation of the object plane from a back surface of the plate to a front surface of the plate is the optical equivalent of a FOFP.

A further improvement to FOFPs is discussed in U.S. patent application Ser. No. 08/473,887, filed Jun. 7, 1995 by Silverstein et. al. and titled "Enhanced Off-Axis Viewing Performance of a Liquid Crystal Display Employing a Fiberoptic Faceplate Having Masked Interstitial Apertures" and herein incorporated by reference.

Diffraction is the deviation from rectilinear propagation that occurs when light waves advance beyond any obstruction or boundary. The obstruction may be opaque, as in the case of a knife-edge or pinhole, or may be a boundary defined by two transparent materials with different refractive indices. Since light reflects, refracts or diffracts from a straight path when encountering a boundary or obstruction, the intensity distribution of a point of light which undergoes diffraction, when projected on a surface some distance from the boundary, will be characterized by a spread function or diffraction pattern. For light transmitted through an aperture, the degree of diffraction or angular deviation in the path of light is determined by the size and shape of the aperture and the wavelength(s) of light from the source. The diffraction pattern at some remote position from the aperture is additionally a function of the distance from the aperture to the plane of observation. The remote or far-field diffraction pattern is typically referred to as a Fraunhoffer diffraction pattern. In optical systems where the circular apertures of lenses, stops and pupils are typically constraints, the Fraunhoffer diffraction pattern is often referred to as the Airy disk. The Airy disk arising from light passing through a circular aperture is well described by a first-order Bessel function with a central bright region surrounded by a series of faint rings of rapidly diminishing intensity. Approximately 84% of the light intensity from a diffracted point source is contained within the first dark ring of the Airy disk. As such, the Airy disk characterizes the blur circle produced by diffraction-limited optical systems.

In assessing the impact of diffraction on FOFPs, U.S. patent application Ser. No. 08/4,673,887, by Silverstein et. al. filed on Jun. 7, 1995 and assigned to Xerox Corporation and which is herein incorporated by reference, focuses on the angular dispersion of light incident on the FOFP. As shown in FIG. 6, the FOFP consists of a fused plate of optical fibers consisting of a core 12 and interstitial cladding 14, which constitute two distinct populations of very small apertures. Both the entrance plane 30 and the exit plane 32 of the cores 12 can be considered as small circular apertures. The cladding 14 on the entrance and exit plane 30, 32 surfaces are somewhat irregular in shape and size. However, for purposes of discussion, the cladding 14 will be described as circular apertures with a diameter estimated from the mean diameter of all claddings 14. Guided ray 16 entering the FOFP is diffracted into an angular distribution of light paths. The degree of diffraction and hence the width of the angular distribution of light paths is inversely proportional to the diameter of the aperture. Thus, the smaller the aperture the larger the angles into which light propagation through the FOFP is diffracted. The cladding 14, being significantly smaller than the core 12, diffracts the incoming light into the largest angles. FIG. 6 also shows the relative Fraunhoffer diffraction patterns or Airy disks 38 which would result from the projection of the core 12 and cladding 14 diffraction angle distributions on the retina of an observer 34 located some fixed distance from the FOFP. The angular spread resulting from diffraction can be estimated from the following equation:

$$q_{diffr} = 1.22[(\lambda)(180)]/[(D)(\pi)]$$

where:

$q_{diffr}$=half-angle corresponding to first dark ring of the Airy pattern (degrees)

D=diameter of circular aperture $\lambda$=wavelength of light

By reference to the above equation and assuming nominal core 12 and cladding 14 diameters of 7 microns and 0.5 microns, respectively, it can be estimated that for incoming light of 550 nm, the diffraction angle corresponding to the first dark ring of the Airy disk 38 is approximately 5.49° for the core 12 apertures and 76.9° for the cladding 14 apertures. For on-axis illumination and on-axis viewing of a LCD with coupled FOFP, the effects of diffraction in the FOFP will be primarily manifested as a small reduction in display luminance. This is in large part a result of the small light acceptance cone of the eye and of most photometric measurement instruments.

FOFP diffraction is responsible for anomalous reductions in on-axis contrast for coupled LCDs. Establishing this causal relationship would enable the development of effective means to reduce these observed reductions in on-axis LCD contrast. To describe this problem, consider the angle-dependent contrast performance of typical twisted-nematic (TN) or super-twisted nematic (STN) LCDs that has been previously described. The contrast ratio of such displays is typically very high when observed on-axis but exhibits a progressive degradation at off-axis viewing and light propagation angles. This observed contrast degradation, while progressive, is not isotropic for the reasons previously described. At some extreme angles, the contrast of the display may actually reverse resulting in a negative image. These off-axis contrast degradations do not affect the high on-axis contrast performance of the display due to the small light acceptance cone of the eye or of most photometric measurement instruments. However, when a FOFP is coupled to such an LCD, the on-axis contrast performance of the FOFP-coupled display is substantially reduced below the levels achieved without the FOFP. Improvement in the on-axis contrast performance of FOFP-coupled LCDs provide an important enhancement.

For light propagating at off-axis angles to contaminate the on-axis contrast performance of an LCD with FOFP, the angular direction must be changed such that some of this light gets coupled into the small light acceptance cone of the eye or measurement instrument. FIG. 7 shows the guided ray 16 emerging from the source (i.e., the backlight) at an angle which is off-axis from the normal N to the FOFP input surface. At the exit plane 32, the light is diffracted by the core 12 apertures and the cladding 14 apertures with an angular distribution about the direction of light propagation. For the larger core 12 apertures, the relatively small diffraction angles do not diffract much light into the light acceptance cone of the observer 34 or instrument. However, for the much smaller cladding 14 apertures, the angular distribution of diffracted off-axis light is quite large and a significant amount of the off-axis light is diffracted into the small light acceptance cone of the observer 34 or measurement instrument. In this manner, the off-axis light from the LCD (and corresponding contrast degradations) are diffracted by the FOFP cladding 14 apertures into the small light acceptance cone of the observer 34 or instrument resulting in significant degradation of on-axis contrast performance of the FOFP-coupled LCD.

The on-axis contrast performance of the FOFP-coupled LCD can be dramatically improved by masking the cladding 14 apertures of the FOFP as shown in FIG. 8. This figure illustrates a FOFP with masked cladding 36 and how such masking prevents the cladding 14 apertures from diffracting off-axis light into the observer's viewing cone. Evaluations of LCDs coupled to FOFPs with masked cladding 36 have confirmed the effectiveness of this enhancement, resulting in dramatic improvements in the on-axis contrast performance of FOFP-coupled LCDs. These analyses and the resulting FOFPs with masked cladding 36 provide significant enhancements to the invention disclosed in U.S. Pat. No. 5,442,467 the subject matter of which is incorporated herein by reference.

These essential optical properties can be imparted to a range of materials, thus producing the FOFP optical equivalents. This application discusses a method employing irradiation sensitive glasses and creating adjacent areas with differing refractive indices which result in a substrate containing a plurality of cylindrical features whose boundaries are defined by a discontinuity of refractive indices wherein the index of refraction within the cylindrical features is greater than the index of refraction at the boundaries and external to the cylindrical features. In an alternative embodiment a substrate containing a plurality of cylindrical features whose boundaries are defined by a light blocking material is created.

Accordingly, it is the primary aim of the invention to produce substrates containing a plurality of cylindrical features whose boundaries are defined by a discontinuity of refractive indices wherein the index of refraction within the cylindrical features is greater than the index of refraction at the boundaries.

Further advantages of the invention will become apparent as the following description proceeds.

SUMMARY OF THE INVENTION

Briefly stated and in accordance with the present invention, methods for making optical plates which have columnar features approximately in the direction of light propagation which are capable of total internal reflection, a controllable numeric aperture (NA) at input and output surfaces, rotational azimuthal averaging and translation of the object plane from a back surface of the plate to a front surface of the plate and are optical equivalent of a FOFP are described. These plates are made from a composition of irradiation sensitive glass which has been etched in either the columnar features or the surrounding features. If the surrounding features have been etched, the etched areas are filled with either a low melt glass, epoxy or plastic, liquid or a light blocking material such as a black composition material. If the columnar features have been etched the etched areas are filled with a low melt glass, epoxy, liquid or plastic. The resultant plates contain adjacent areas with differing refractive indices which result in a substrate containing a plurality of cylindrical features whose boundaries are defined by a discontinuity of refractive indices wherein the index of refraction within the cylindrical features is greater than the index of refraction at the boundaries and external to the cylindrical features.

Figure 1:
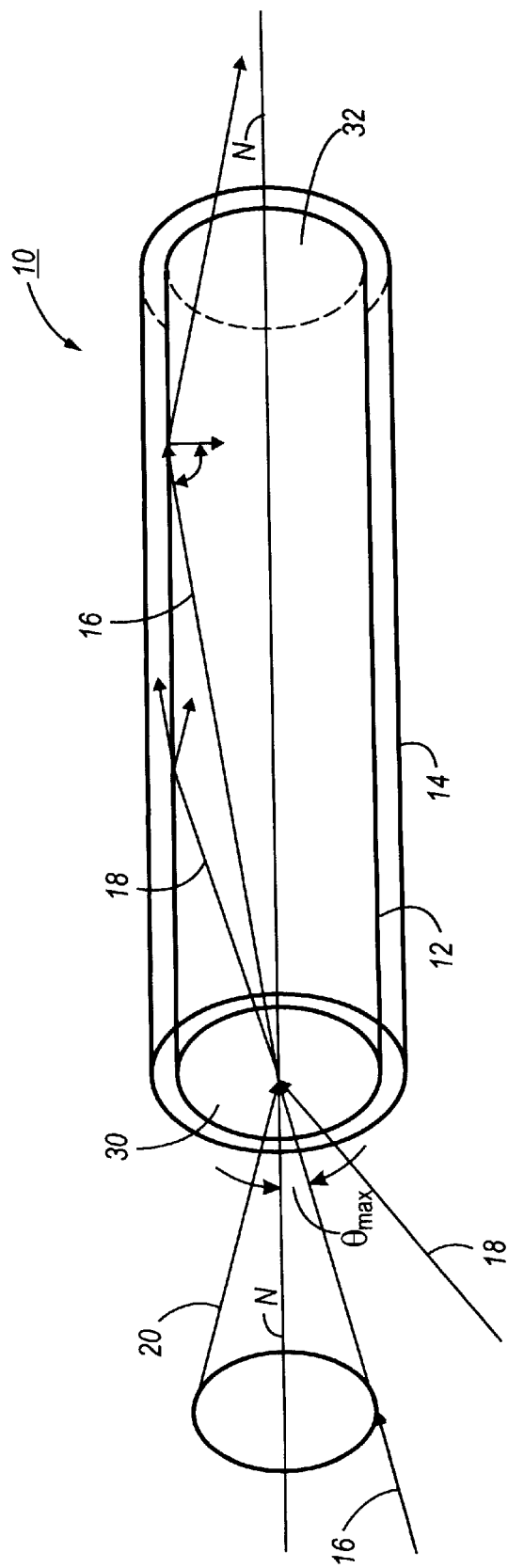
FIG. 1 is a side view of an optic fiber illustrating an acceptance cone of light entering the optic fiber and guided and unguided light rays.
Figure 2:
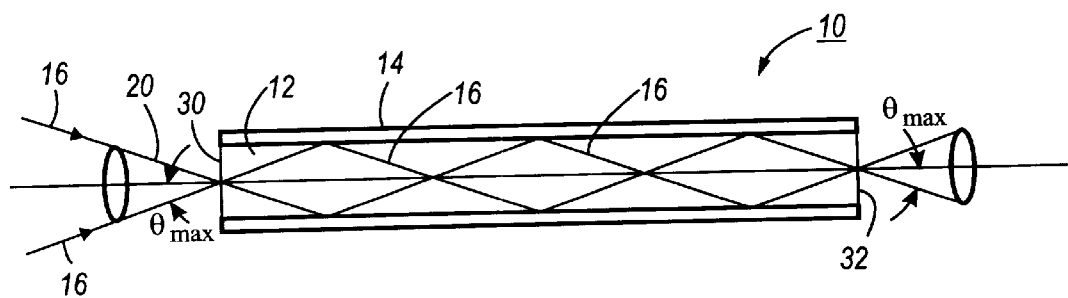
FIG. 2 is a side view of an optic fiber illustrating a narrow acceptance cone.
Figure 3:
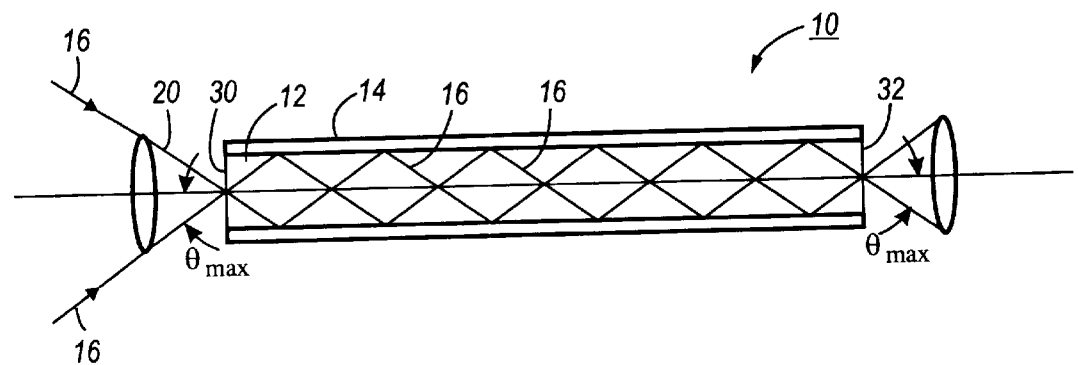
FIG. 3 is a side view of an optic fiber illustrating a wide acceptance cone.
Figure 4:
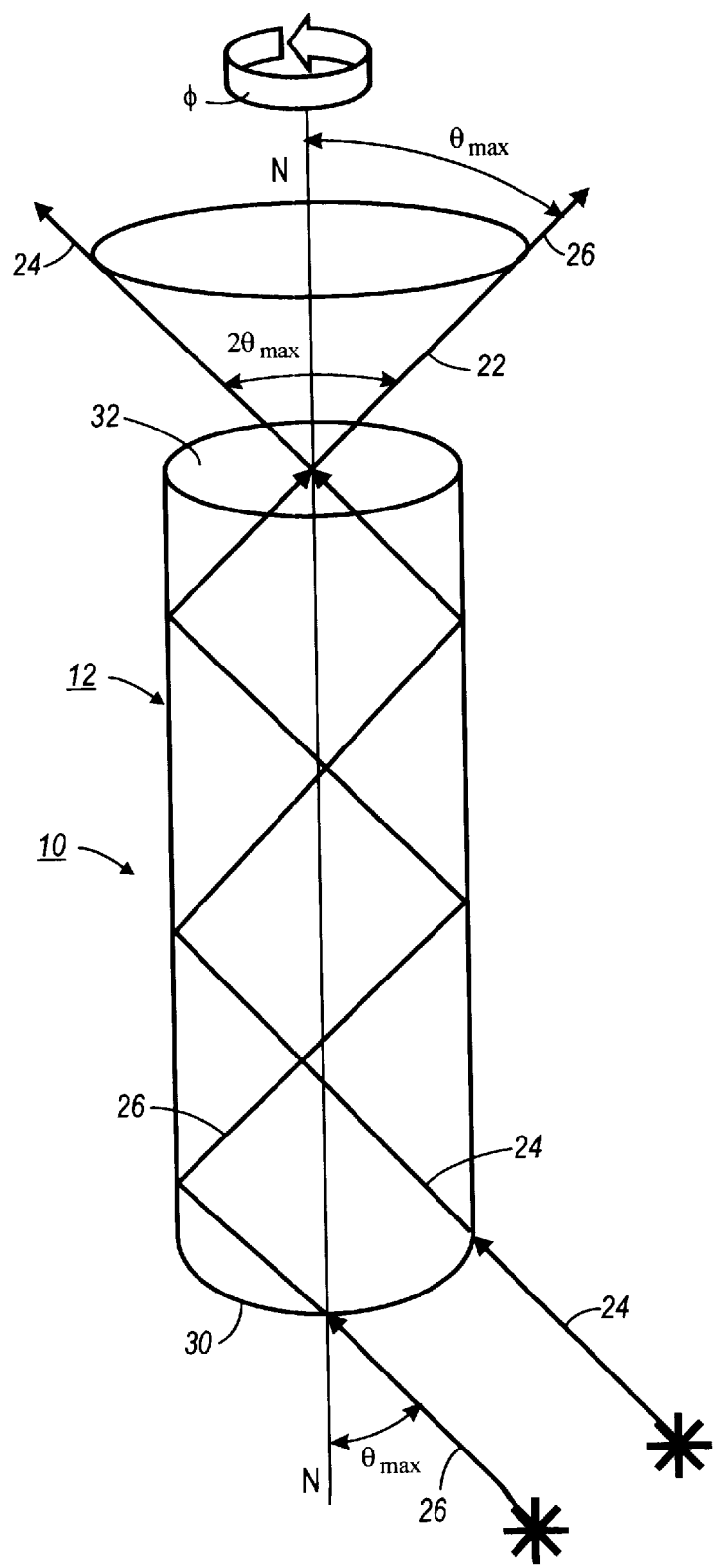
FIG. 4 is a side view of an optic fiber illustrating azimuthal averaging.
Figure 5:
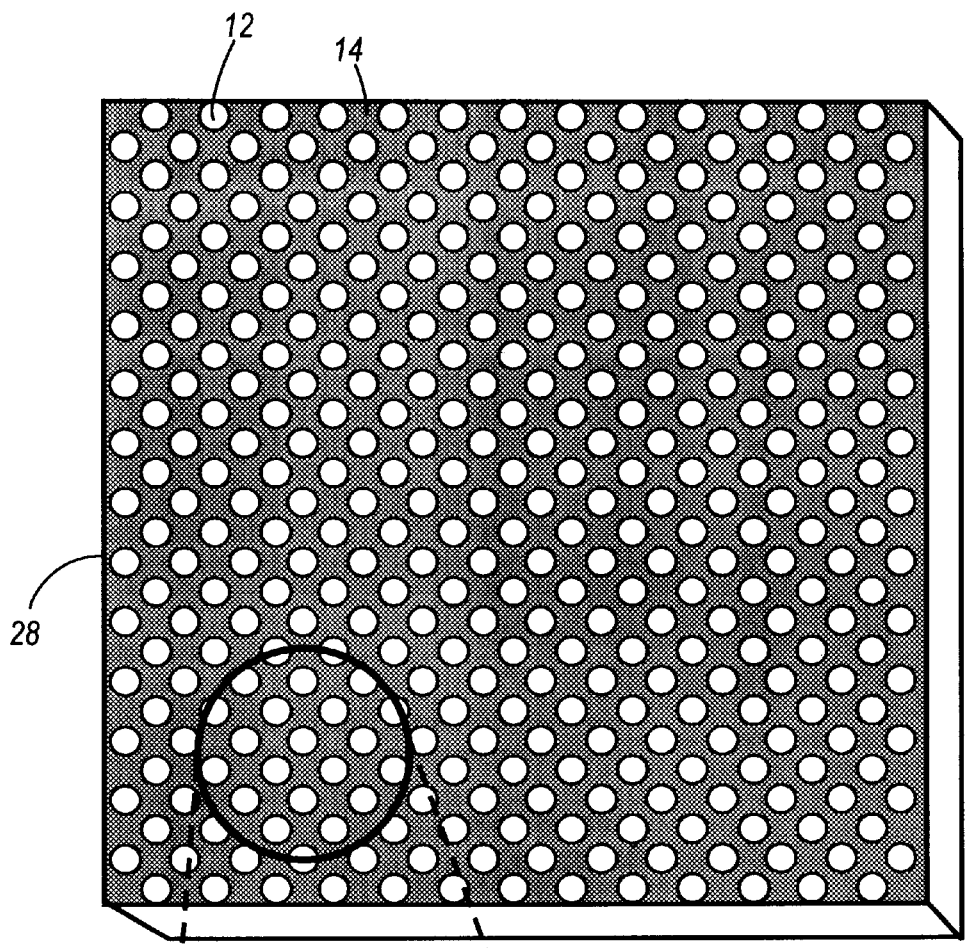
FIGS. 5 and 5a are top views of a prior art FOFP.
Figure 5A:
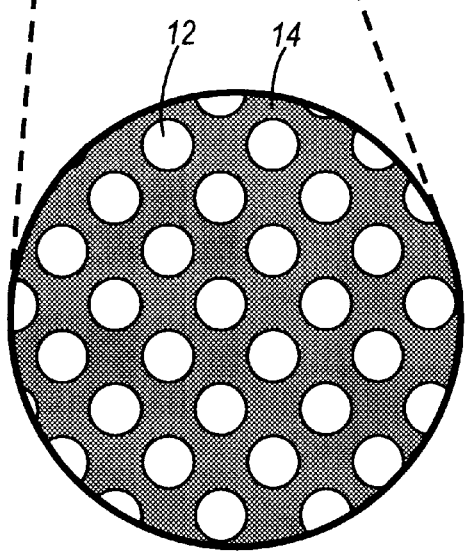
Figure 6:
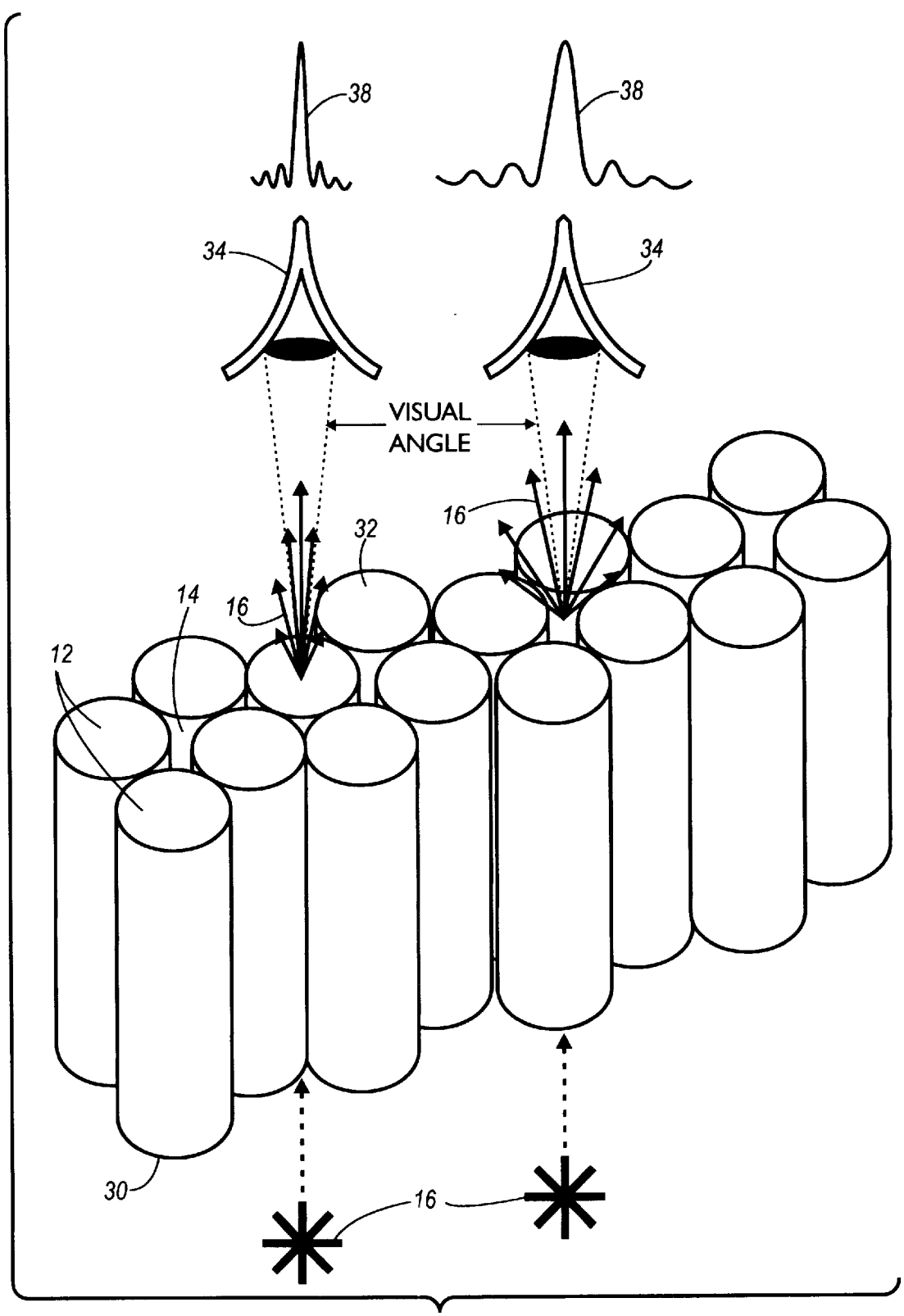
FIG. 6 illustrates light diffraction in a fiber-optic faceplate for off-axis light incidence.
Figure 7:
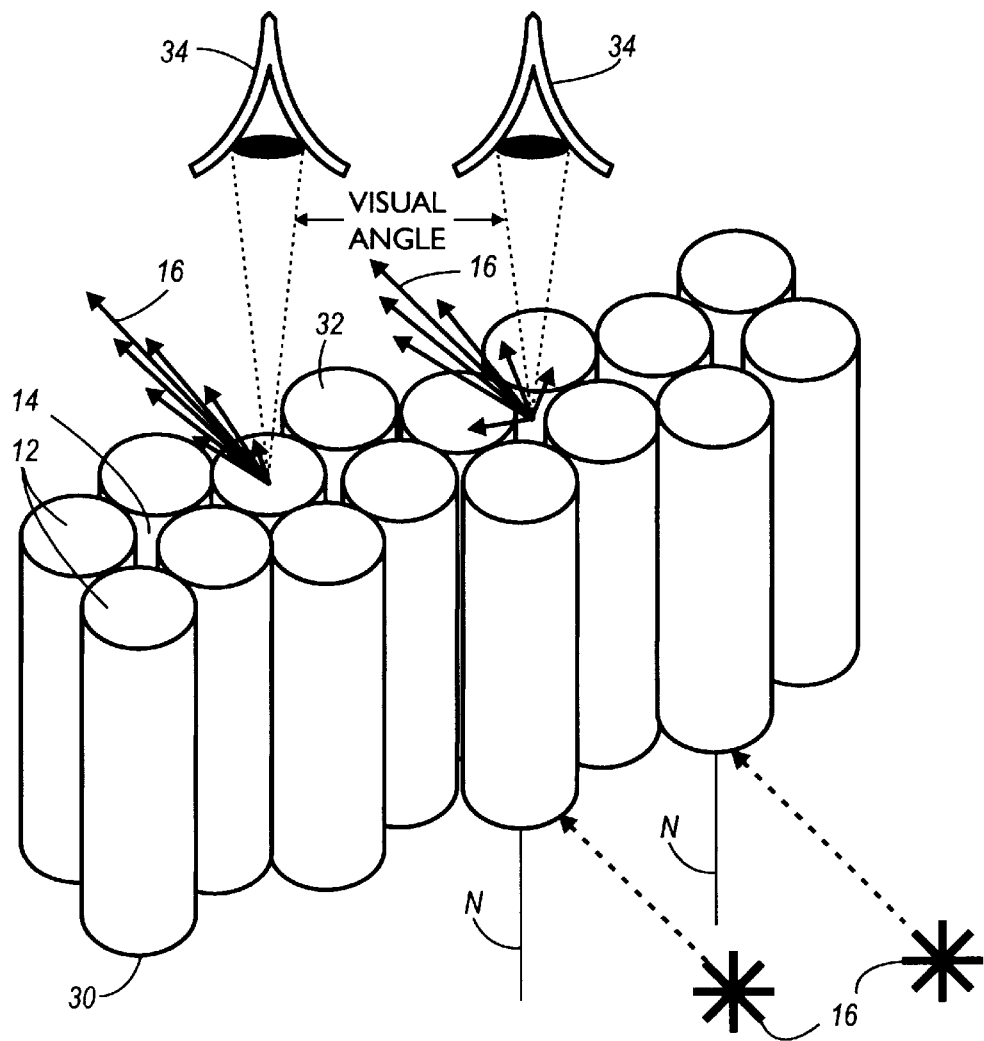
FIG. 7 illustrates the diffraction-related contrast degradation in a fiber-optic faceplate having transparent cladding apertures.
Figure 8:
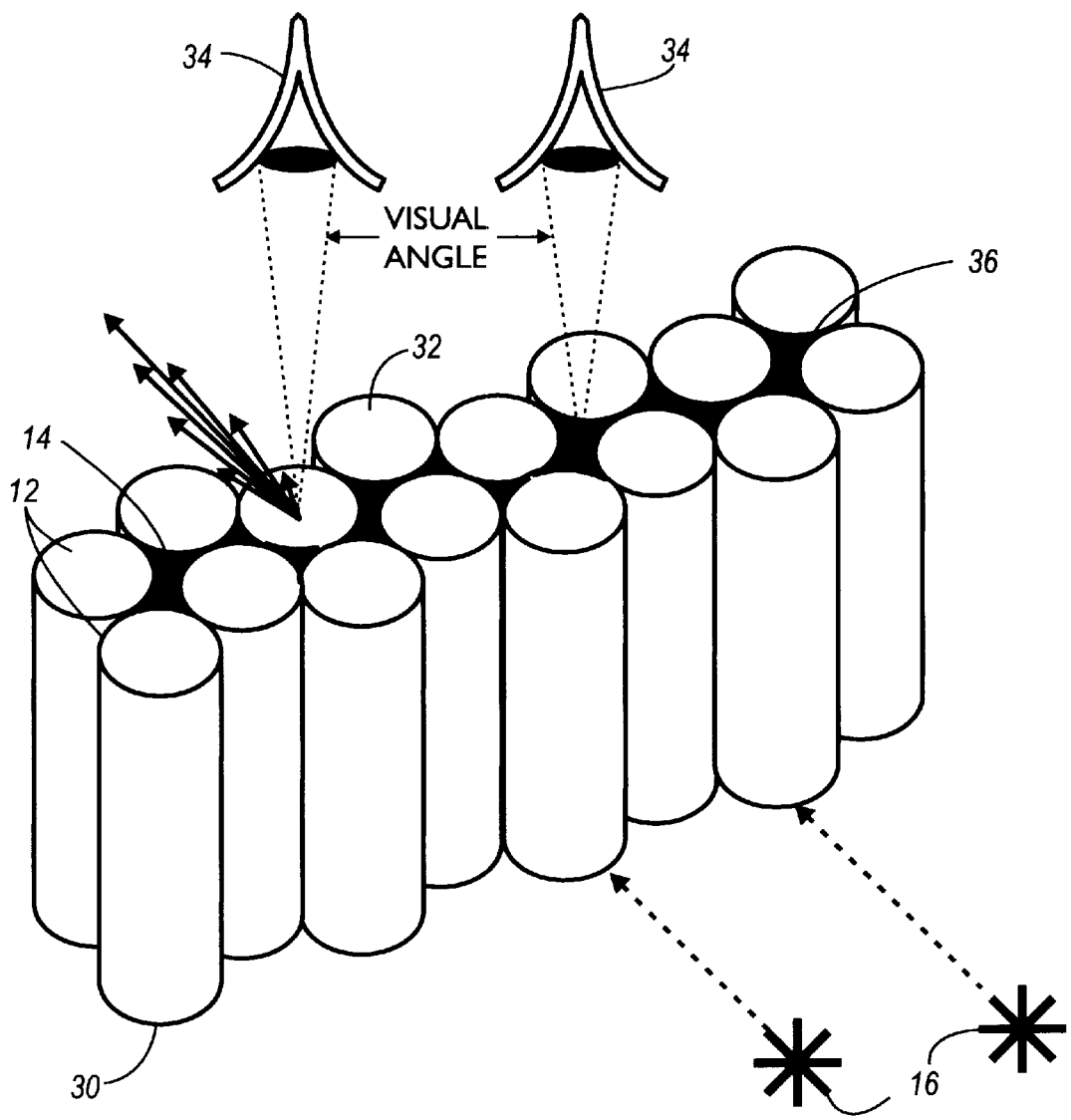
FIG. 8 illustrates the reduction in diffraction-related contrast degradation in a fiber-optic faceplate having opaque cladding.

While the present invention will be described in connection with a preferred embodiment and method of use, it will be understood that it is not intended to limit the invention to that embodiment or procedure. On the contrary, it is intended to cover all alternatives, modifications and equivalents as may be included within the spirit and scope of the invention as defined by the appended claims.

LIST OF ELEMENTS angle $\theta_{max}$
azimuthal rotation angle $\phi$
normal N
optical fiber 10 core 12
cladding material 14
guided ray 16
unguided ray 18
acceptance cone 20
hollow exit cone 22
light ray 24
light ray 26
FOFP 28
entrance plane 30
exit plane 32
observer 34
masked cladding 36
airy disks 3 8
glass substrate 40
mask 60
collimated UV radiation 62
"core" areas 64
"cladding" areas 66
core non-irradiation areas 68
cladding irradiation areas 70
remaining portion 72
etched portion 74
low index fluid, glass, plastic, or light blocking material 76
transparent core irradiation areas 78
opaque cladding non-irradiation areas 80
high index glass or plastic 82
liquid retaining plate 84
light blocking material 86

DETAILED DESCRIPTION OF THE INVENTION

Figure 9:
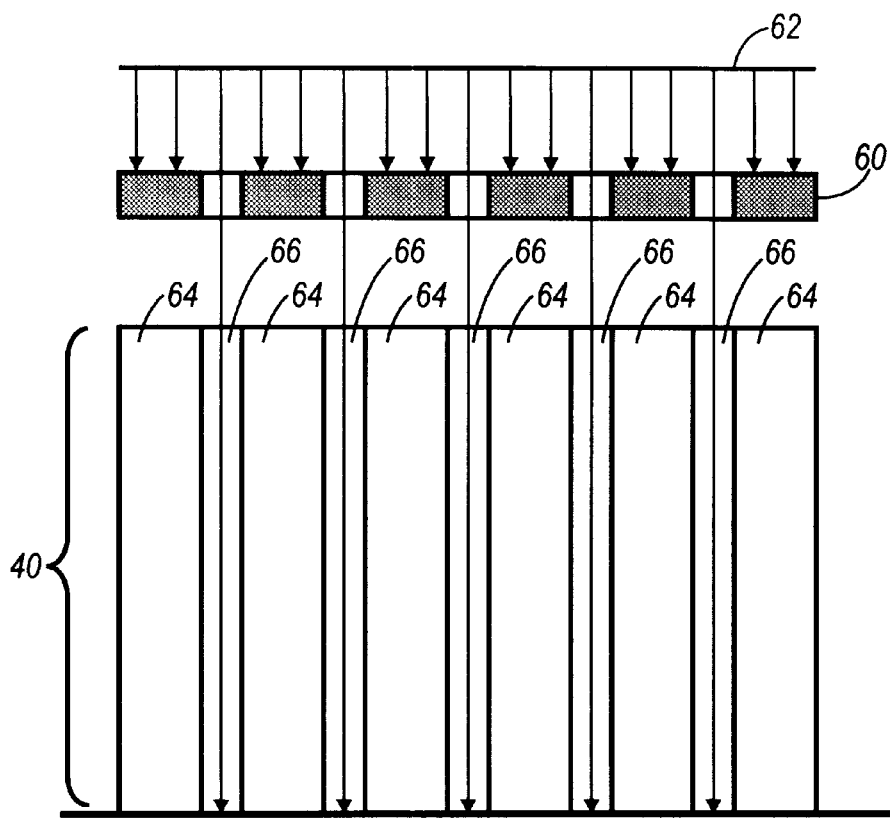
FIG. 9 is a side view of a plate of irradiation sensitive glass in a first process step to make an FOFP optical equivalent according to the present invention.

Turning now to FIG. 9, an irradiation sensitive glass substrate 40 is shown. The important property of irradiation sensitive glass is a sensitivity to light which alters properties of the glass such as the etch ratio of those portions of the glass exposed to UV light. One example of such a glass is Peg-3 glass or Fotoform glass (both available from Hoya Corporation in Tokyo, Japan) which, when irradiated, change from a non-crystalline or amorphous structure to a crystalline structure. The etch ratio of crystalline glass is approximately fifty times that of amorphous glass.

The glass substrate 40 is divided into two types of areas, "core" areas 64 and "cladding" areas 66. In order for the glass substrate 40 to operate as a FOFP, the "core" areas 64 must exhibit total internal reflection of any light entering the "core" areas 64. In order for total internal reflection to take place within the "core" areas 64, an index of refraction ($n_{core}$) for the "core" areas 64 must be greater than an index of refraction ($n_{clad}$) for the "cladding" areas 66. The difference in indices of refraction between the "core" areas 64 and "cladding" areas 66 is expressed as a numerical aperture (NA) which is the square root of the difference of the squares of the two indices of refraction, and is described by the equation:

$$NA = [n^2_{core} - n^2_{clad}]^{1/2}.$$

Fiber optic faceplates with numerical apertures in the approximate range of 0.4 to 1.0 are suitable for use in various applications of liquid crystal displays.

Figure 10:
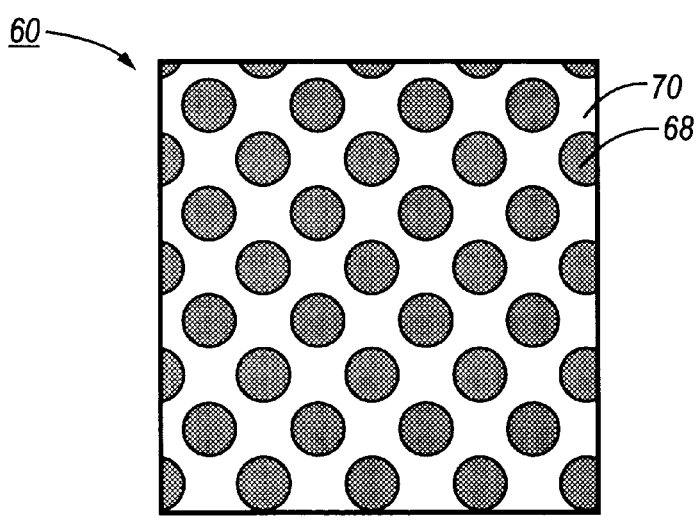
FIG. 10 is a top view of a mask used in the process step shown in FIG. 9.

In order to set up the different indices of refraction in the "core" areas 64 and the "cladding" areas 66, the glass substrate 40 is irradiated with collimated UV radiation 62 through a mask 60. A top view of the mask 60 is shown in FIG. 10. The mask 60 is divided into opaque core non-irradiation areas 68 and transparent cladding irradiation areas 70. The collimated UV radiation 62 will not pass through the core irradiation areas 68 of the mask 60 and therefore not strike the glass substrate 40 in the "core" areas 64. The "core" areas 64 will therefore remain as amorphous glass.

The collimated UV radiation 62 however will pass through the cladding irradiation areas 70 of the mask 60 and strike the glass substrate 40 in the "cladding" areas 66, thereby altering its characteristics in the "cladding" areas 66. In this example, the "cladding" areas 66 have become crystalline glass with a much higher etch rate than the amorphous glass in the "core" areas 64.

Figure 11:
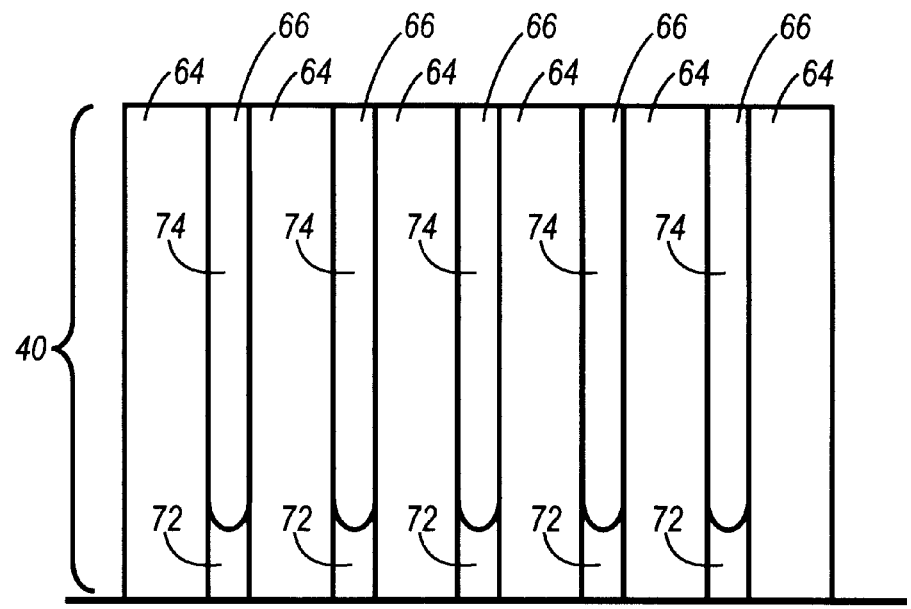
FIG. 11 is a side view of a plate of irradiation sensitive glass in a second process step to make an FOFP optical equivalent according to the present invention.

The glass substrate is now subjected to an etch bath with the result as shown in FIG. 11. The best known differential etch rate would be obtained form using a 5% hydrofluoric acid solution (5% HF) which would achieve a 50:1 differential etch rate between the "cladding" areas 66, which are crystalline glass, and the "core" areas 64, which are amorphous glass. The glass substrate 40 is immersed in an etchant bath for a sufficient period of time to partially etch and remove the "cladding" areas 66 leaving a remaining portion 72 of the "cladding" areas 66 and an etched portion 74 of the "cladding" areas 66 as shown in FIG. 11. The "cladding" areas 66 are not completely etched away so that the remaining portion 72 of the "cladding" areas 66 can be used to provide structural support.

Once partial etching of the "cladding" areas 66 has been accomplished, the glass substrate 40 may be annealed to smooth the edges of the etched portion 74 of the "cladding" areas 66 in the glass substrate 40. The specifics of the annealing process will vary with the particular type of glass substrate 40 used. However, if PEG-3 glass available from Hoya is used then the preferred annealing process should proceed in four phases.

The first phase is to heat the glass substrate 40 from room temperature to approximately 350±50 degrees centigrade at a rate of approximately 150±50 degrees centigrade per hour. The second phase is to heat the glass substrate 40 from 350 degrees centigrade to at least 590 degrees centigrade at a rate of approximately 60±20 degrees per hour. The purpose of the differential heating rates is to avoid problems due to internal stress caused by rapid heating of the glass.

Once the glass substrate 40 has been heated to approximately 590 degrees centigrade, the third phase of the annealing process is to hold the temperature constant for at least 45 minutes to allow annealing to occur. After the glass substrate 40 has been annealed, then it may be cooled back to room temperature at a rate of approximately 150±50 degrees centigrade per hour for further processing.

Figure 12:
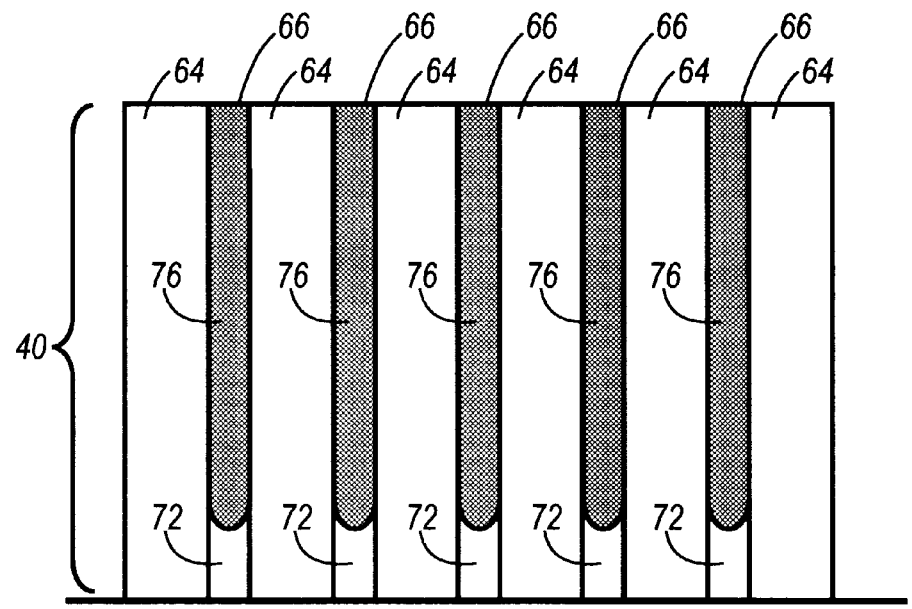
FIG. 12 is a side view of a plate of irradiation sensitive glass in a third process step to make an FOFP optical equivalent according to the present invention.

After annealing and cooling, the etched portion 74 of the glass substrate 40 can then be filled with a melted low index glass, plastic, or light blocking material 76 as shown in FIG. 12. A variety of materials can be used such as plastics, epoxies or low melting point glasses. If a black matrix is desired a plastic which is embedded with particles of carbon black can be used.

Figure 13:
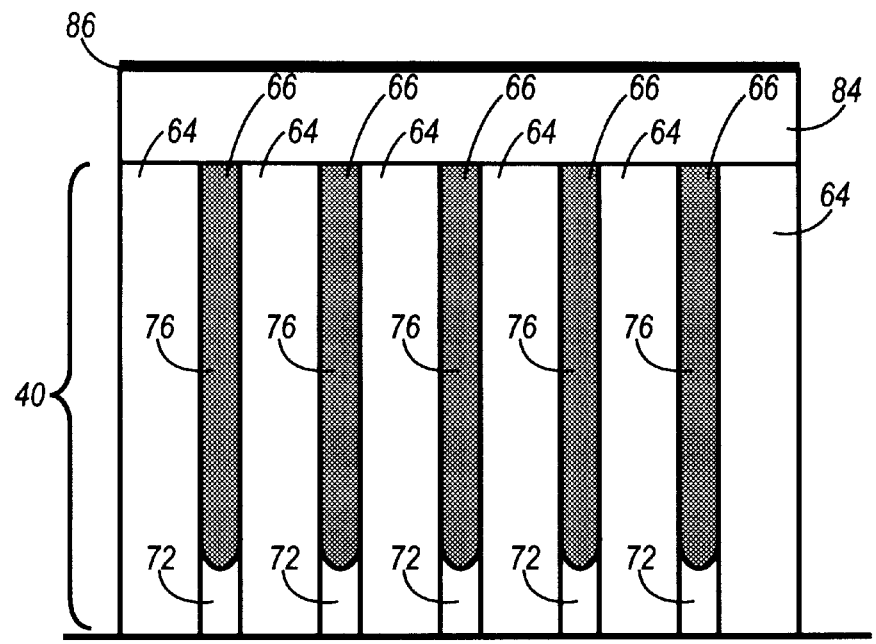
FIG. 13 is a side view of a plate of irradiation sensitive glass in an optional fourth process step to make an FOFP optical equivalent according to the present invention.
Figure 14:
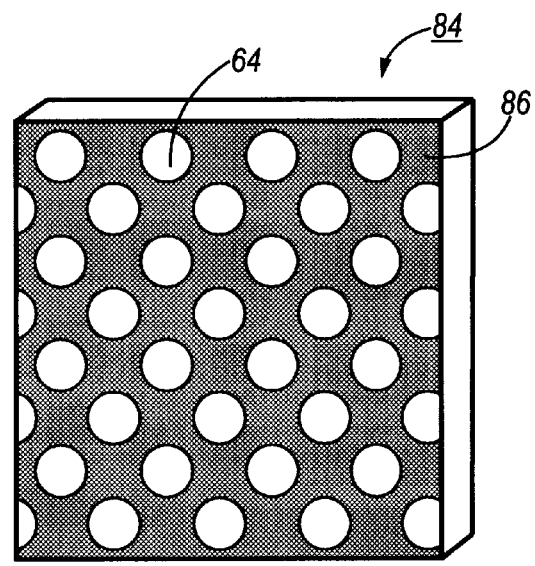
FIG. 14 a perspective view of a liquid retaining plate.

In an alternate embodiment, shown in FIG. 13, the etched portion 74 may be filled with a suitable low index fluid. However, this then requires the addition of a thin glass or plastic liquid retaining plate 84 on the etched surface of the glass substrate to hold the liquid in contact with the glass substrate 40. If opaque cladding apertures are desired, the liquid retaining plate may be coated with a thin layer of light blocking material 86 over the "cladding" areas 66 to provide for the opaque cladding apertures as is know in the art. A perspective view of a liquid retaining plate 84 with light blocking material 86 applied to one surface of the liquid retaining plate 84 is shown in FIG. 14. The "core" area 64 are not covered by the light blocking material 86. When the liquid retaining plate 84 is assembled onto the etched surface of the glass substrate 40, as shown in FIG. 13, it is preferable that the light blocking material 86 be on the outward surface of the assembly and not on against the etched surface of the glass substrate 40, as shown in FIG. 13. Although the device may still function if the liquid retaining plate 84 with the light blocking material 86 is assembled such that the light blocking material 86 is against the etched surface of the glass substrate 40, having the light blocking material 86 on the outside surface is preferable.

The most important criteria is that the liquid, glass, plastic or light blocking material 76 in the "cladding" areas 66 have a smaller index of refraction than the "core" areas 64 in order for total internal reflection to take place within the "core" areas 64. If the liquid, glass, plastic or light blocking material 76 in the "cladding" areas 66 is a light blocking material, such as a black matrix material, then the additional benefit of improvements in the on-axis contrast performance of FOFP-coupled LCDs will also be achieved. It is not necessary that the entire etched portion 74 of the "cladding" areas 66 be filled with a light blocking material to achieve this benefit, merely filling a small portion of the etched area 74 will suffice, preferably a portion nearest what will be a light exit plane of the finished device.

Figure 15:
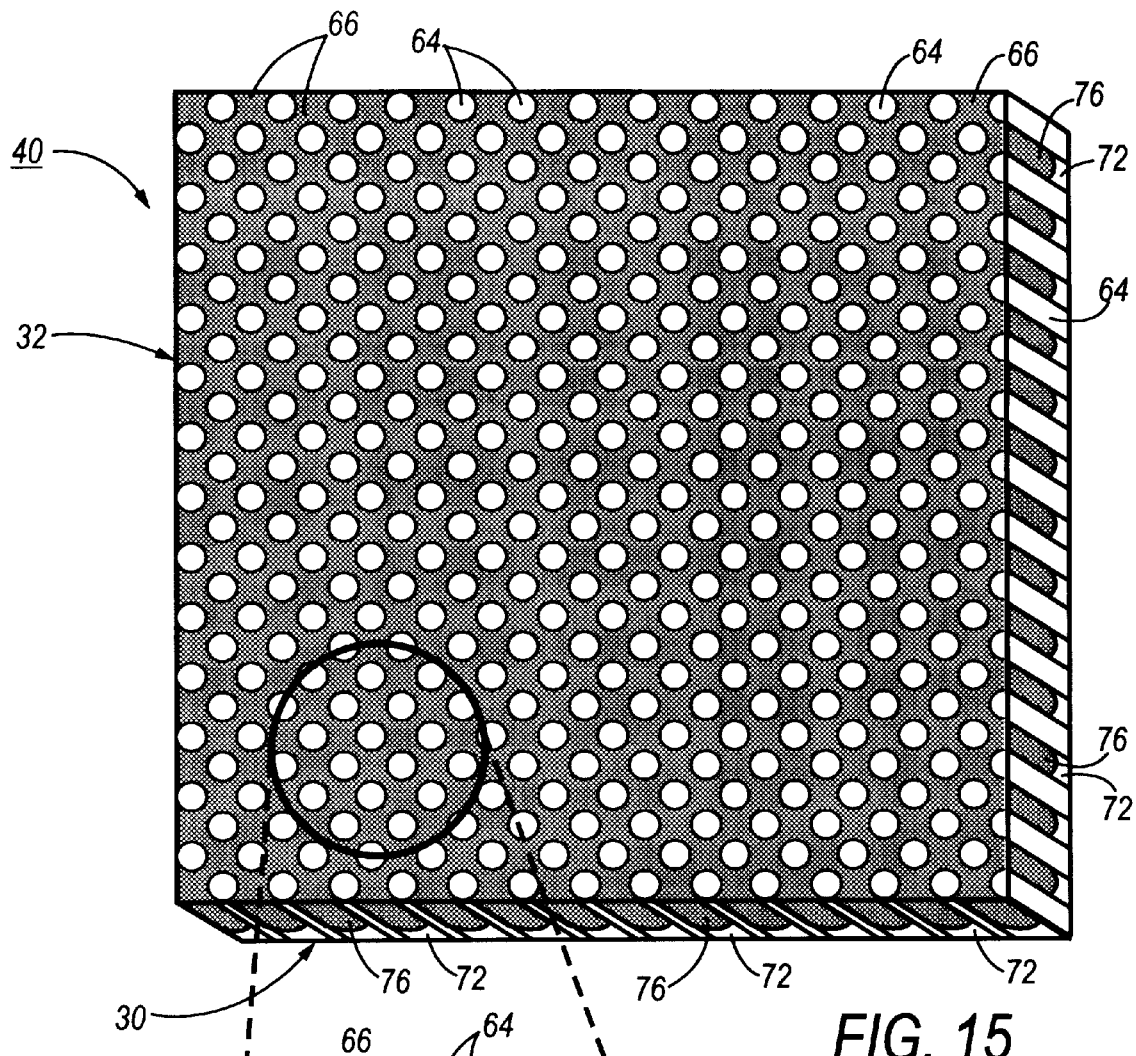
FIGS. 15 and 15a are perspective views of a FOFP made using the process steps described in either FIGS. 9–14.
Figure 15A:
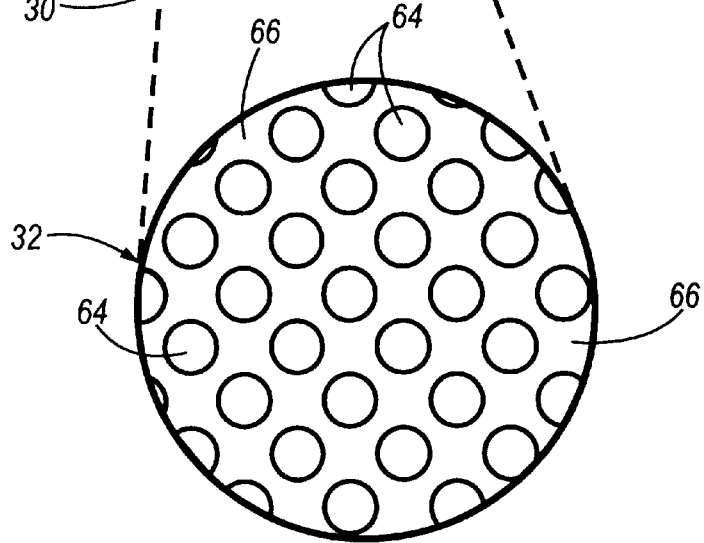
Figure 16:
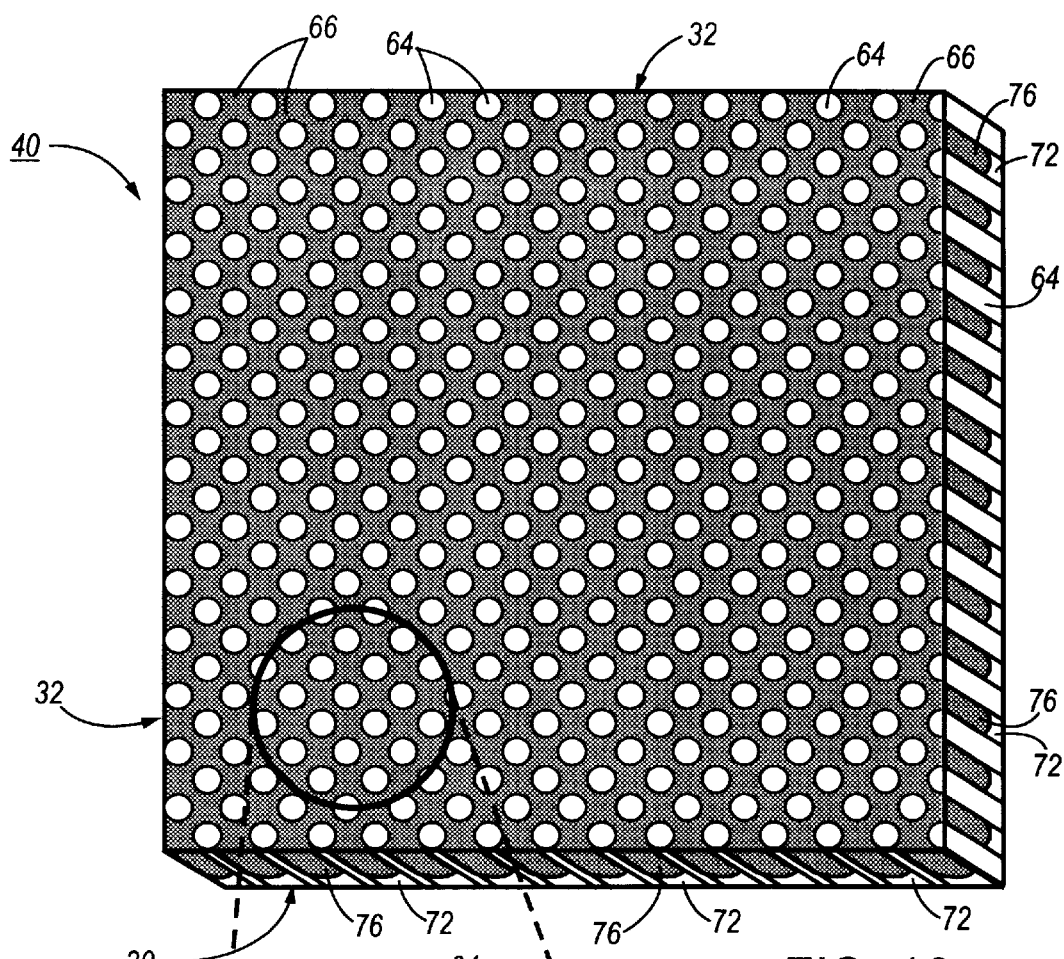
FIG. 16 is a perspective view of an alternate FOFP made using the process steps described in FIGS. 9–14.
Figure 16A:
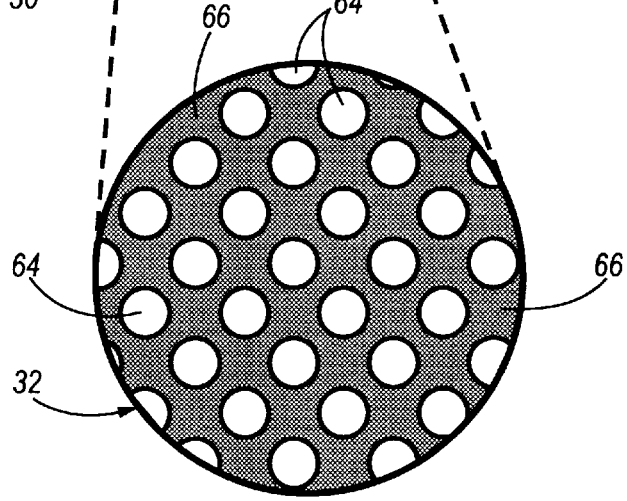

The resultant product will appear as shown in either FIG. 15 or FIG. 16. FIG. 15 shows the glass substrate 40 having been divided into columnar features that make up the "core" areas 64 and the surrounding material that make up the "cladding" areas 66. The columnar features making up the "core" areas 64 extend substantially from a light entrance plane 30 to a light exit plane 32. When in use light generally enters the "core" areas at the light entrance plane 30, propagates through the "core" areas 64 and generally exits through the light exit plane 32. Both the "core" areas 64 and the "cladding" areas 66 have indices of refraction with the "core" areas 64 having an index of refraction greater than the "cladding" areas 66 sufficient to promote internal reflection of light entering the "core" areas 64. It should be noted that the "cladding" areas 66 have two portions. The remaining portion 72 of the original material that was not etched to provide structural support and the low index glass or plastic 76 that was used to fill the etched portion 74.

FIG. 16 shows the glass substrate 40 having been divided into columnar features that make up the "core" areas 64 and the surround material that make up the "cladding" areas 66. The columnar features making up the "core" areas 64 extend substantially from a light entrance plane 30 to a light exit plane 32. When in use light generally enters the "core" areas at the light entrance plane 30, propagates through the "core" areas 64 and generally exits through the light exit plane 32. Both the "core" areas 64 and the "cladding" areas 66 have indices of refraction with the "core" areas 64 having an index of refraction greater than the "cladding" areas 66 sufficient to promote internal reflection of light entering the "core" areas 64. The "cladding" areas 66 are at least partially of a light blocking material, preferably at the exit plane 32 surface to prevent diffracting off-axis light into the observer's viewing cone resulting in improvements on the on-axis contrast performance of FOFP-coupled LCDS. It should be noted that the "cladding" areas 66 have two portions. The remaining portion 72 of the original material that was not etched to provide structural support and the light blocking material 76 used to fill the etched portion 74.

A structure constructed as above using the above named materials will have an index of refraction for the "core" areas 64 of approximately 1.5 if glass is used and an index of refraction for the "cladding" areas 66 of approximately 1.42 if triflouroisopropylmethalcrylate is used. These indices of refraction lead to a numeric aperture of $NA=[n^2_{core}-n^2_{clad}]^{1/2}=[1.5^2-1.42^2]^{1/2}=0.48$. These examples are for illustrative purposes only and any glass or plastic with an index of refraction between approximately 1.45 and approximately 1.12 may be used with the Fotoform glass to provide an appropriate numeric aperture.

If a fluid and a liquid retaining plate are used, as shown in FIG. 12*b,* then a suitable liquid is water. If water is used, which has an index of refraction of 1.33, then the $NA=[n^2_{core}-n^2_{clad}]^{1/2}=[1.52-1.33^2]^{1/2}=0.69$. Again, water is used for illustrative purposes only, and any fluid with an index of refraction between approximately 1.45 and approximately 1.12 may be used with the Fotoform glass including dark or opaque fluids which would provide light blocking properties to the "cladding" areas 66.

It should also be possible to perform this same process by etching the "core" areas 64 rather than the "cladding" areas 66 and achieve similar results, as shown in FIGS. 17–22. The same reference numerals will be shown in FIGS. 17–22 to denote equivalent structures with the extension "a" appended to the reference numeral.

Figure 17:
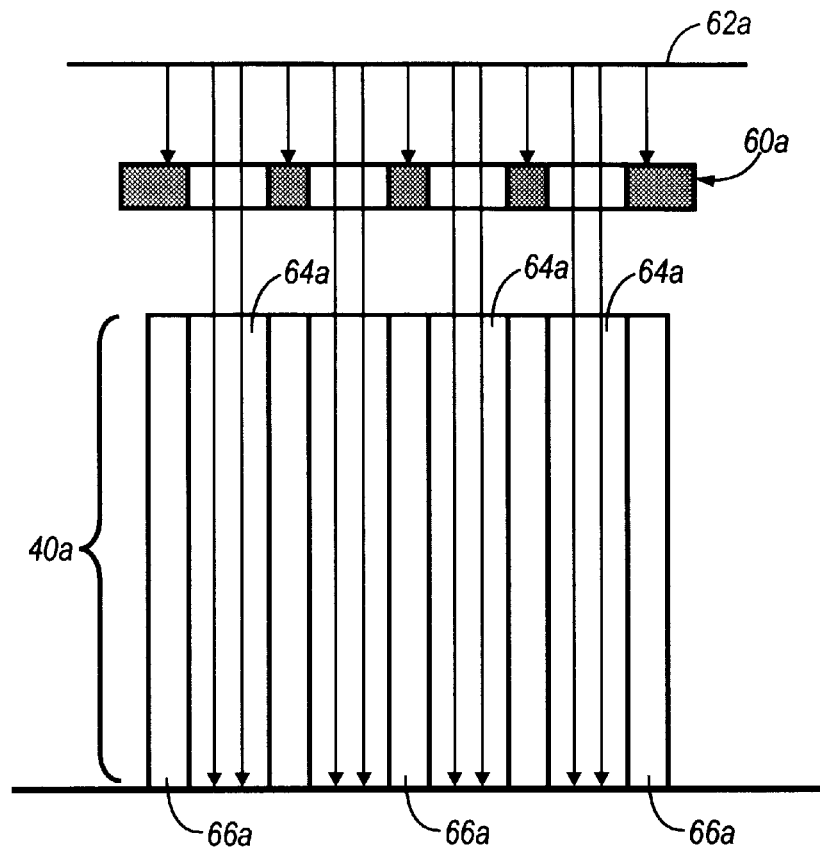
FIG. 17 is a side view of a plate of irradiation sensitive glass in an alternate first process step to make an FOFP optical equivalent according to the present invention.

Turning now to FIG. 17, an irradiation sensitive glass substrate 40*a* is shown. The glass substrate 40*a* is divided into two types of areas, "core" areas 64*a* and "cladding" areas 66*a.* In order for the glass substrate 40*a* to operate as a FOFP, the "core" areas 64*a* must exhibit total internal reflection of any light entering the "core" areas 64*a.* In order for total internal reflection to take place within the "core" areas 64*a,* an index of refraction ($n_{core}$) for the "core" areas 64*a* must be greater than an index of refraction ($n_{clad}$) for the "cladding" areas 66*a.*

Figure 18:
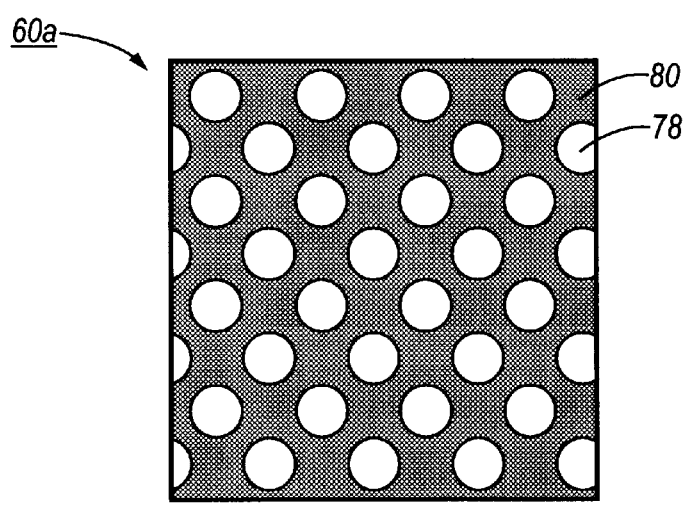
FIG. 18 is a top view of a mask used in the process step shown in FIG. 17.

In order to set up the different indices of refraction in the "core" areas 64*a* and the "cladding" areas 66*a,* the glass substrate 40 is irradiated with collimated UV radiation 62*a* through a mask 60*a.* A top view of the mask 60*a* is shown in FIG. 18. The mask 60*a* is divided into transparent core irradiation areas 78 and opaque cladding non-irradiation areas 80. The collimated UV radiation 62*a* will not pass through the cladding non-irradiation areas 80 of the mask 60*a* and therefore not strike the glass substrate 40*a* in the "cladding" areas 66*a.* The "cladding" areas 66*a* will therefore remain as amorphous glass.

The collimated UV radiation 62*a* however will pass through the core irradiation areas 78 of the mask 60*a* and strike the glass substrate 40*a* in the "core" areas 64*a,* thereby altering its characteristics in the "core" areas 64*a.* In this example, the "core" areas 64*a* have become crystalline glass with a much higher etch rate than the amorphous glass in the "cladding" areas 64*a.*

Figure 19:
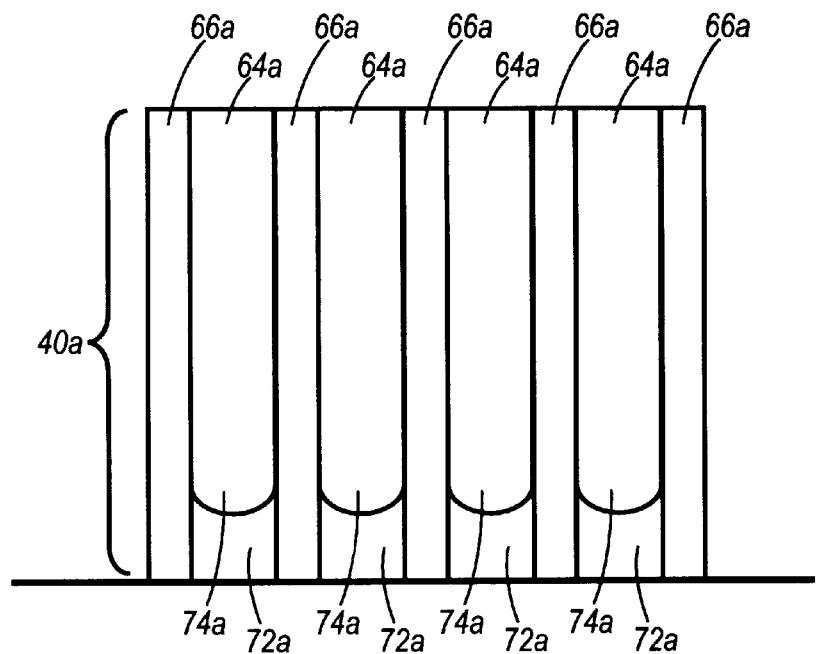
FIG. 19 is a side view of a plate of irradiation sensitive glass in an alternate second process step to make an FOFP optical equivalent according to the present invention.

The glass substrate is now subjected to an etch bath with the result as shown in FIG. 19. The best known differential etch rate would be obtained form using a 5% hydrofluoric acid solution (5% HF) which would achieve a 50:1 differential etch rate between the "cladding" areas 66*a,* which are amorphous glass, and the "core" areas 64*a,* which are crystalline glass.

The glass substrate 40*a* is immersed in an etchant bath for a sufficient period of time to partially etch and remove the "core" areas 64*a* leaving a remaining portion 72*a* of the "core" areas 64*a* and an etched portion 74*a* of the "core" areas 64*a* as shown in FIG. 15. The "core" areas 64*a* are not completely etched away so that the remaining portion 72*a* of the "core" areas 64*a* can be used to provide structural support.

Once partial etching of the "core" areas 64a has been accomplished, the glass substrate 40a is annealed to smooth the edges of the etched portion 74a of the "core" areas 64a in the glass substrate 40a. The specifics of the annealing process will vary with the particular type of glass substrate 40a used. However, if PEG-3 glass available from Hoya is used then the preferred annealing process should proceed in the four phase process described previously.

Figure 20:
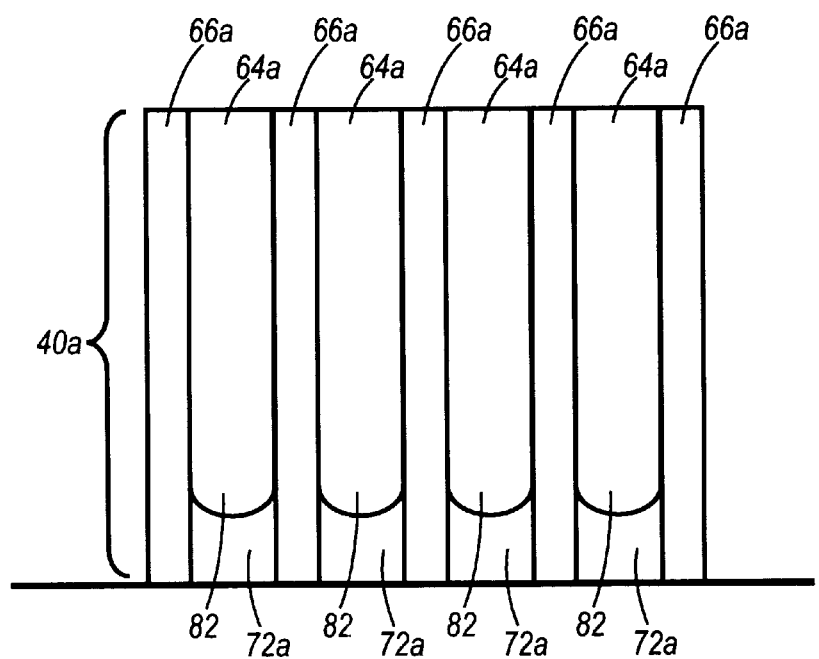
FIG. 20 is a side view of a plate of irradiation sensitive glass in an alternate third process step to make an FOFP optical equivalent according to the present invention.

After annealing and cooling, the etched portion 74 in the "core" areas 64a of the glass substrate 40a can then be filled with a melted high index glass, epoxy or plastic 82 as shown in FIG. 20. A variety of materials can be used such as napthal methacrylate or vinyl carbazole.

Figure 21:
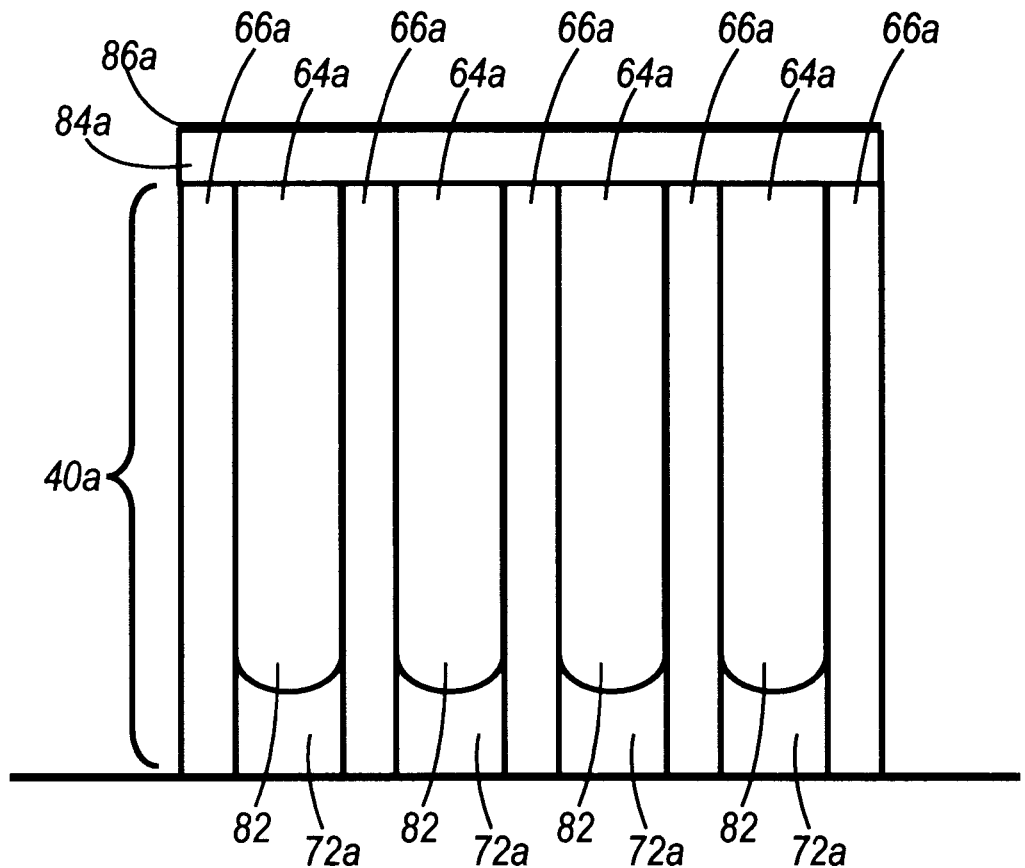
FIG. 21 is a side view of a plate of irradiation sensitive glass in an optional fourth process step to make an FOFP optical equivalent according to the present invention.

Alternatively, as shown in FIG. 21, the etched portion 74a may be filled with a suitable high index fluid, such as cassia oil or carbon disulfide. However, this then requires the addition of a thin glass or plastic liquid retaining plate 84a on the etched surface of the glass substrate to hold the liquid in contact with the glass substrate 40a. If opaque cladding apertures are desired, the liquid retaining plate may be coated with a thin layer of light blocking material over the "cladding" areas 66a to provide for the opaque cladding apertures as is know in the art. The liquid retaining plate 84a is identical to the one shown in FIG. 12c. The "core" area 64a is not covered by the light blocking material 86a. When the liquid retaining plate 84a is assembled onto the etched surface of the glass substrate 40a, as shown in FIG. 21, it is preferable that the light blocking material 86a be on the outward surface of the assembly and not on against the etched surface of the glass substrate 40a, as shown in FIG. 21. Although the device may still function if the liquid retaining plate 84a with the light blocking material 86a is assembled such that the light blocking material 86a is against the etched surface of the glass substrate 40a, having the light blocking material 86a on the outside surface is preferable.

The most important criteria is that the glass or plastic 82 in the "core" areas 64a have a higher index of refraction than the "cladding" areas 66a in order for total internal reflection to take place within the "core" areas 64a.

Figure 22:
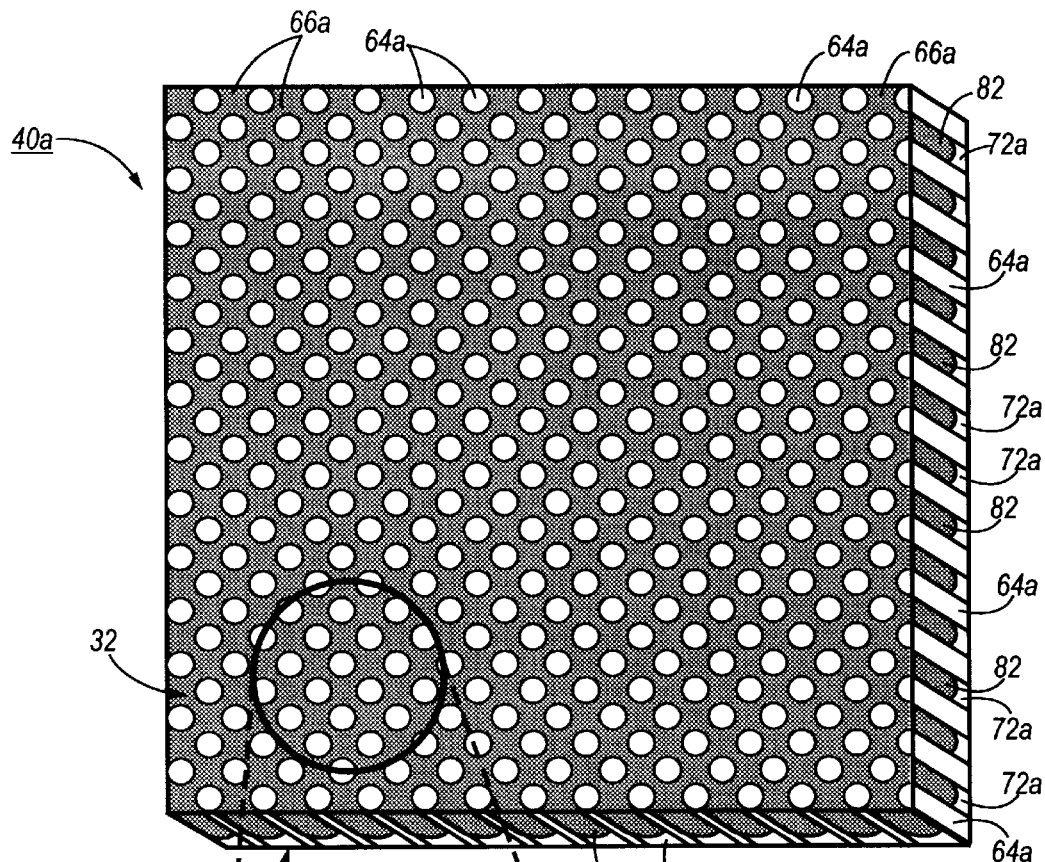
FIGS. 22 and 22a are perspective views of a FOFP made using the process steps described in either FIGS. 17–21.
Figure 22A:
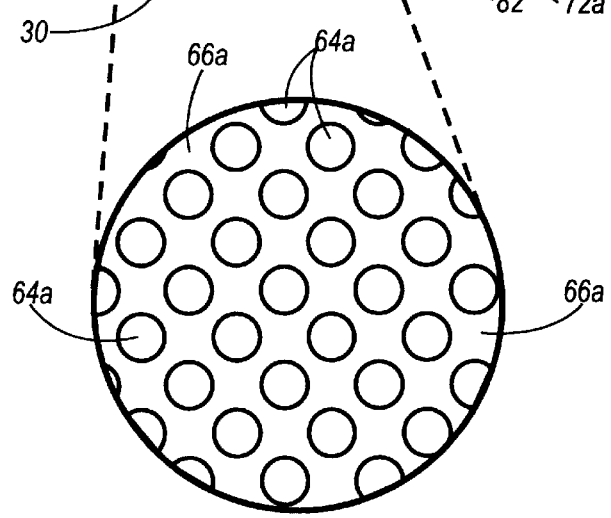

The resultant product will appear as shown in FIG. 22. FIG. 22 shows the glass substrate 40a having been divided into columnar features that make up the "core" areas 64a and the surrounding material that makes up the "cladding" areas 66a. The columnar features making up the "core" areas 64a extend substantially from a light entrance plane 30 to a light exit plane 32. When in use light generally enters the "core" areas at the light entrance plane 30, propagates through the "core" areas 64 and generally exits through the light exit plane 32. Both the "core" areas 64a and the "cladding" areas 66 have indices of refraction with the "core" areas 64a having an index of refraction greater than the "cladding" areas 66a sufficient to promote internal reflection of light entering the "core" areas 64a. It should be noted that the "core" areas 64a have two portions. The remaining portion 72a of the original material that was not etched to provide structural support and the high index glass, epoxy or plastic 82 that was used to fill in the etched portion 74a.

A structure constructed as above using the above named materials will have an index of refraction for the "core" areas 64a of approximately 1.683 if naptha methacrylate is used and an index of refraction for the "cladding" areas 66a of approximately 1.5 if Fotoform glass is used. These indices of refraction lead to a numeric aperture of $NA=[n^2_{core}-n^2_{clad}]^{1/2}=[1.64^2=1.5^2]^{1/2}=0.66$. However, it should be noted that this is an example only and any transparent glass or plastic with an index of refraction between approximately 1.55 and approximately 1.80 may be used with the Fotofrom glass to provide an appropriate numeric aperture.

If a fluid and a liquid retaining plate are used, as shown in FIG. 21, then a suitable liquid is cassia oil. If water is used, which has an index of refraction of 1.33, then the $NA=[n^2_{core}-n^2_{clad}]^{1/2}=[1.7^2-1.5^2]^{1/2}=0.8$. Again, cassia oil is used for illustrative purposes only, and any fluid with an index of refraction between approximately 1.55 and approximately 1.80 may be used with the Fotoform glass to provide an appropriate numeric aperture.

What is claimed is:

1. An optical plate comprising
   a) a light entrance plane and a light exit plane,
   b) at least one substantially columnar feature extending generally from the light entrance plane to the light exit plane wherein light generally enters the at least one columnar feature at the light entrance plane, propagates through the at least one columnar feature and generally exits through the light exit plane, and said at least one columnar feature having a core index of refraction,
   c) at least one cladding feature generally surrounding said at least one columnar feature, wherein said at least one cladding feature is at least partially opaque, and
   d) said at least one substantially columnar feature comprising irradiation sensitive glass having an index of refraction and at least a portion of said at least one cladding feature comprising a fill material having an index of refraction less than the index of refraction of the irradiation sensitive glass.

2. The optical plate of claim 1 wherein said light entrance plane and said light exit plane are substantially parallel to each other.

3. The optical plate of claim 2 wherein the at least one columnar feature extends in a direction substantially perpendicular to said light entrance plane and said light exit plane.

4. The optical plate of claim 1 wherein said at least one cladding feature is opaque at the exit plane.

5. The optical plate of claim 1 wherein the fill material is substantially opaque.

6. The optical plate of claim 1 wherein the fill material comprises a plastic.

7. The optical plate of claim 1 wherein the fill material comprises epoxy.

8. The optical plate of claim 1 wherein the fill material comprises a plastic embedded with particles of carbon black.

9. The optical plate of claim 1 wherein the optical plate further comprises means for retaining a liquid within at least a portion of said at least one cladding feature and the fill material comprises a liquid.

10. The optical plate of claim 9 wherein the means for retaining a liquid within said at least one cladding feature is a liquid retaining plate.

11. The optical plate of claim 10 wherein the liquid retaining plate is glass.

12. The optical plate of claim 10 wherein the liquid retaining plate further comprises a light blocking layer which substantially covers said at least one cladding feature.

13. The optical plate of claim 12 wherein the light blocking layer is a layer of metal.

14. The optical plate of claim 9 wherein the liquid comprises water.

15. The optical plate of claim 9 wherein the liquid is opaque.

16. The optical plate of claim 1 wherein said at least one cladding feature partially comprises irradiation sensitive glass.

17. The optical plate of claim 1 wherein the core index of refraction of the irradiation sensitive glass is approximately 1.5.

18. The optical plate of claim 1 wherein the index of refraction of the fill material is between approximately 1.12 and approximately 1.45.

19. An optical plate comprising
   a) light entrance plane and a light exit plane,
   b) at least one substantially columnar feature extending generally from the light entrance plane to the light exit plane wherein light generally enters the at least one columnar feature at the light entrance plane, propagates through the at least one columnar feature and generally exits through the light exit plane, and said at least one columnar feature having a core index of refraction,
   c) at least one cladding feature generally surrounding said at least one columnar feature, wherein said at least one cladding feature is at least one partially opaque, and
   d) at least a portion of said at least one substantially columnar feature comprising a fill material having an index of refraction and said at least one cladding feature comprising irradiation sensitive glass having an index of refraction less than the index of refraction of the fill material.

20. The optical plate of claim 19 wherein said at least one substantially columnar feature partially comprises irradiation sensitive glass.

21. The optical plate of claim 19 wherein the fill material comprises plastic.

22. The optical plate of claim 19 wherein the fill material comprises epoxy.

23. The optical plate of claim 19 wherein the optical plate further comprises means for retaining a liquid within at least a portion of said at least one columnar feature and the fill material comprises a liquid.

24. The optical plate of claim 23 wherein the liquid comprises cassia oil.

25. The optical plate of claim 23 wherein the liquid comprises carbon disulfide.

26. The optical plate of claim 19 wherein the means for retaining a liquid within said at least one columnar feature is a liquid retaining plate.

27. The optical plate of claim 26 wherein the liquid retaining plate is glass.

28. The optical plate of claim 26 wherein the liquid retaining plate further comprises a light blocking layer which substantially covers said at least one cladding feature.

29. The optical plate of claim 26 wherein the light blocking layer is a layer of metal.

30. The optical plate of claim 19 wherein the index of refraction of the irradiation sensitive glass is approximately 1.5.

31. The optical plate of claim 19 wherein the index of refraction of the fill material is between approximately 1.55 and approximately 1.80.

32. The optical plate of claim 19 wherein said light entrance plane and said light exit plane are substantially parallel to each other.

33. The optical plate of claim 19 wherein the at least one columnar feature extends in a direction substantially perpendicular to said light entrance plane and said light exit plane.

34. The optical plate of claim 19 wherein said at least one cladding feature is opaque at the exit plane.

* * * * *